(12) United States Patent
Adam

(10) Patent No.: US 10,059,032 B2
(45) Date of Patent: Aug. 28, 2018

(54) METHOD OF FORMING A REINFORCING ELEMENT

(75) Inventor: Quentin Arthur Carl Adam, Sydney (AU)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 1150 days.

(21) Appl. No.: 13/982,251

(22) PCT Filed: Oct. 26, 2011

(86) PCT No.: PCT/US2011/057819
§ 371 (c)(1),
(2), (4) Date: Jul. 26, 2013

(87) PCT Pub. No.: WO2013/062534
PCT Pub. Date: May 2, 2013

(65) Prior Publication Data
US 2013/0316104 A1 Nov. 28, 2013

(51) Int. Cl.
*B28B 13/02* (2006.01)
*C04B 28/02* (2006.01)
*C04B 20/10* (2006.01)
*E04C 5/07* (2006.01)

(52) U.S. Cl.
CPC ........ *B28B 13/021* (2013.01); *C04B 20/1077* (2013.01); *C04B 28/02* (2013.01); *E04C 5/07* (2013.01); *E04C 5/073* (2013.01); *Y10T 428/1314* (2015.01); *Y10T 428/1355* (2015.01)

(58) Field of Classification Search
None
See application file for complete search history.

(56) References Cited

U.S. PATENT DOCUMENTS

| | | | | |
|---|---|---|---|---|
| 4,096,944 | A | * 6/1978 | Simpson | ............. C04B 40/0666 106/784 |
| 4,158,082 | A | 6/1979 | Belousofsky | |
| 5,308,572 | A | 5/1994 | Hackman | |
| 5,452,968 | A | * 9/1995 | Dlugosz | .................. E04H 12/22 126/152 R |
| 6,878,323 | B2 | 3/2005 | Fyfe | |
| 7,419,333 | B2 | * 9/2008 | Bussey, Jr. | ............. E02B 11/005 156/293 |
| 2004/0107874 | A1 | 6/2004 | Drozd et al. | |

OTHER PUBLICATIONS

International Preliminary Report on Patentability for PCT/US2011/057819 filed Oct. 26, 2011, dated May 8, 2014, issued Apr. 29, 2014.
Office Action received for U.S. Appl. No. 13/502,312, dated Jun. 20, 2014 and filed on Apr. 16, 2012.
International Search Report and Written Opinion filed Oct. 26. 2011, dated Mar. 8, 2012.

* cited by examiner

Primary Examiner — Benjamin A Schiffman

(57) ABSTRACT

A reinforcing element and a method of forming the reinforcing element are generally described. The reinforcing element may be used in reinforcing a cementitious material and may comprise a settable material and a tension-resistant material that extends for a length of the element. To form the reinforcing element the settable material and tension-resistant material may be disposed together such that the settable and tension-resistant materials generally take the form of the reinforcing element. The settable material may then be cured.

8 Claims, 3 Drawing Sheets

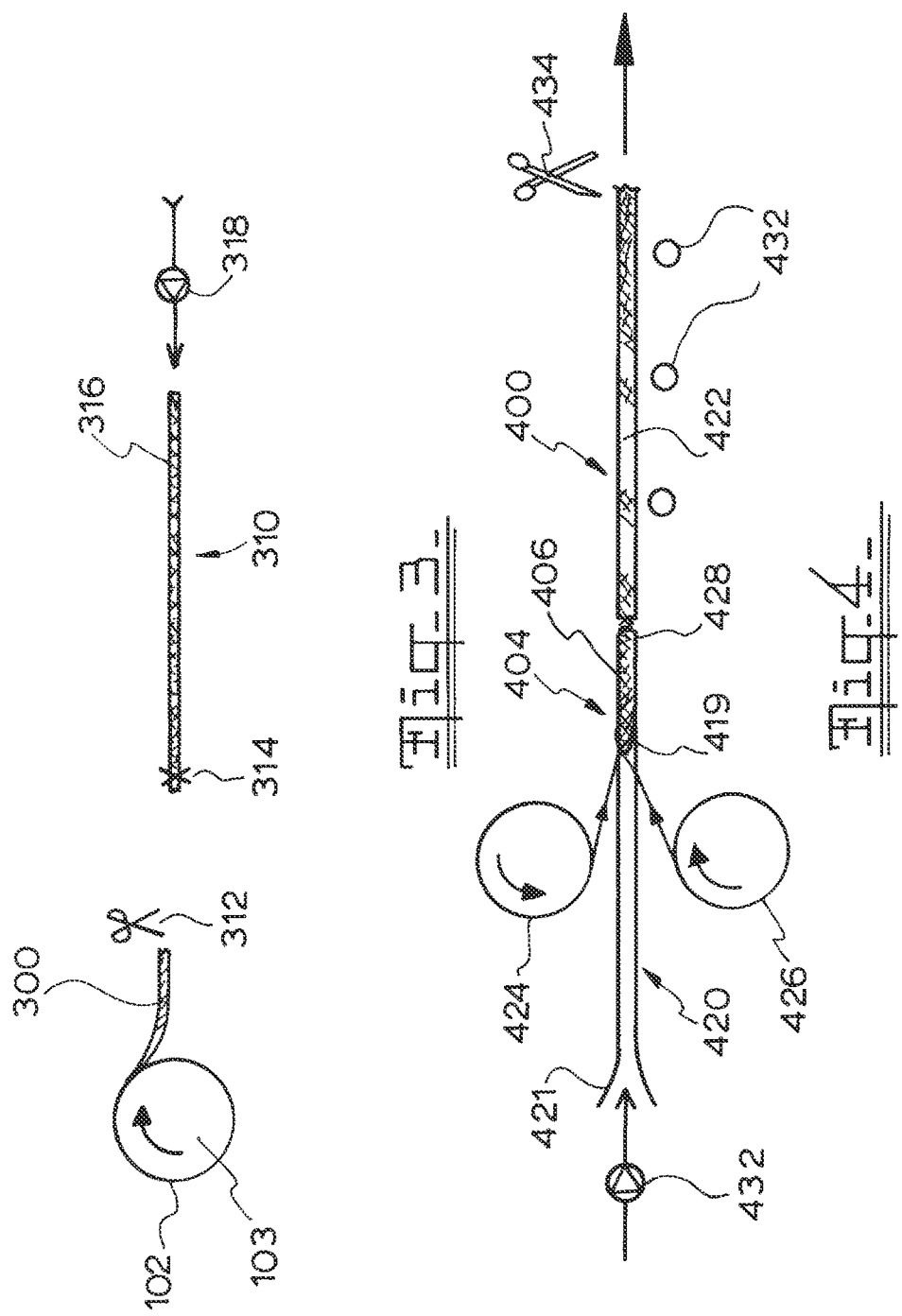

METHOD OF FORMING A REINFORCING ELEMENT

CROSS REFERENCE TO RELATED APPLICATIONS

This Application is the National Stage filing under 35 U.S.C § 371 of PCT Application Ser. No. PCT/US 2011/057819 filed on Oct. 26, 2011. The disclosure of the PCT Application is herein incorporated by reference in its entirety.

BACKGROUND

Unless otherwise indicated herein, the materials described in this section are not prior art to the claims in this application and are not admitted to be prior art by inclusion in this section.

Whilst cement and concrete have excellent compressive strength, they have poor tensile strength. For this reason, cement and concrete may be reinforced, for example, by embedding steel reinforcing rods or bars therein prior to curing.

Steel reinforcing rods/bars are prone to corrosion, which can lead to "concrete cancer" (i.e. the steel corrodes within the concrete/cement and causes it to split or fracture).

SUMMARY

In some embodiments, a reinforcing element and a method of forming a reinforcing element are generally described. The reinforcing element may be used in reinforcing a cementitious material and may comprise a settable material and a tension-resistant material. The tension-resistant material may extend for a length of the element. To form the reinforcing element the settable material and tension-resistant material may be disposed together such that the settable and tension-resistant materials generally take the form of the reinforcing element. The settable material may then be cured.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the drawings:

FIG. 3 illustrates schematically a first method of forming an example reinforcing element; and FIG. 4 illustrates schematically a second method of forming an example reinforcing element;

Figure 1:
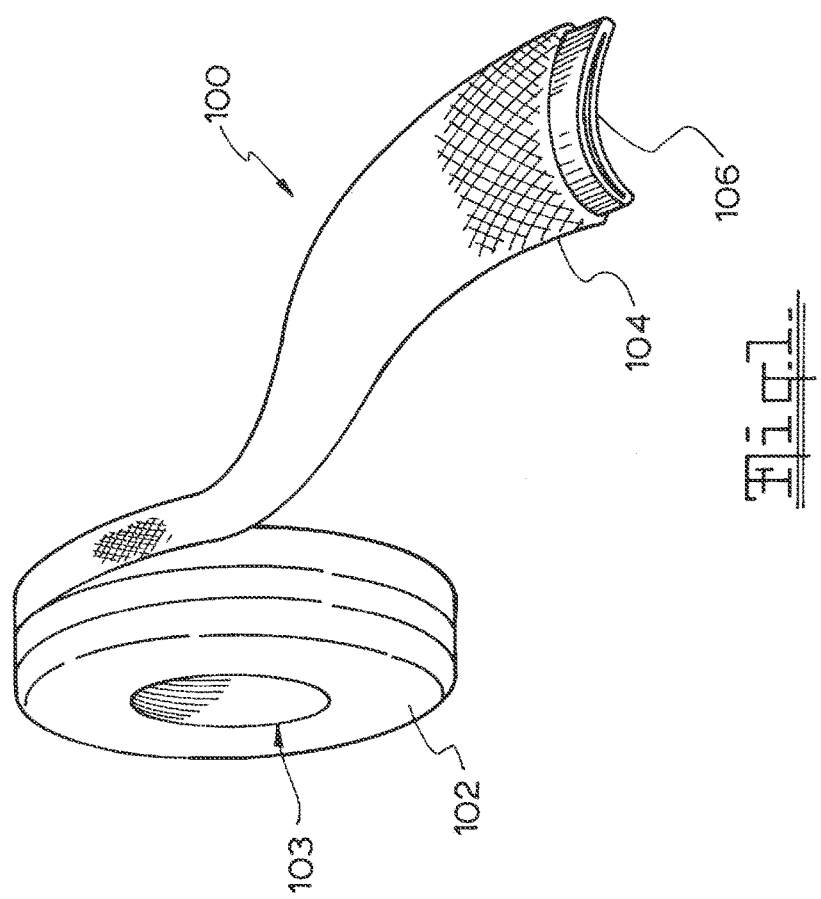
FIG. 1 shows a diagrammatic perspective view of an example reinforcing element as it is being unrolled from a long roll on a circular spool.

all arranged according to at least some embodiments described herein.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally directed, inter alia, to methods of forming reinforcing elements, systems of employing reinforcing elements and reinforcing elements for use in reinforcing cementitious materials including cement and concrete. It should be understood that the methods, systems, and elements disclosed herein may be deployed and employed with a wide range of cementitious materials.

Briefly stated, a reinforcing element is disclosed that may be used in reinforcing a cementitious material such as cement or concrete. The reinforcing element may comprise a settable material and a tension-resistant material. The tension-resistant material may extend for a length of the reinforcing element. A method of forming the reinforcing element is also disclosed. To form the reinforcing element the settable material and tension-resistant material may be disposed together such that the settable and tension-resistant materials can generally take the form of the reinforcing element. The settable material may then be cured, such as by being allowed to cure or by accelerating its cure (e.g. through heat). The tension-resistant and settable materials may provide a composite structural element such as a composite beam (e.g. of a slender format).

FIG. 1 is a diagrammatic perspective view of an example reinforcing element according to at least some embodiments described herein, in the form of an example elongate reinforcing bar 100. The example reinforcing bar 100 as shown forms part of a long roll 102 of reinforcing bar. The roll 102 of reinforcing bar may be flexible such that it can be stored on a spool 103. In FIG. 1, a discrete length of the example reinforcing bar 100 has been unrolled from the long roll 102 retained on the spool 103, whereupon a discrete length is able to be detached (e.g. cut) from the long roll.

The example reinforcing bar 100 can be deployed, for example, in place of a steel reinforcing rod or bar that is used in concrete and cement foundation structures in civil, industrial, commercial and domestic contexts (e.g. such foundation structures may include slabs, floors, footings, driveways, roads, bridges, paths, walkways, etc, and that may form part of or be associated with buildings, constructions and other structures). However, the example reinforcing bar 100 may be used in other applications, such as a border in landscaping, in retaining walls, in a pathway, etc.

The example reinforcing bar 100 includes a tension-resistant material in the form of an external casing 104 of fibrous material. The external casing 104 has, or is able to assume, a tubular form (e.g. as in FIG. 2B). In this regard, the external casing 104 may be flexible so that, when in a tubular form, the casing 104 may be flattened when e.g. it is located on the roll 102 (e.g. as shown in FIG. 2A). In accordance with the methods as disclosed herein, a settable material may be introduced into the external casing 104, either when it is already in a tubular form, or to cause it to assume a tubular form.

The external casing 104 may be formed from a plurality of fibres. For example, the fibre selected for the external casing may be a flexible fibrous material having high tensile resistance such as glass fibre, aramid fibre or carbon fibre. Depending on the fibre selected, the material for the external casing 104 may be more or less stiff than steel reinforcing. When a fibre that is stiffer than steel is employed, a relatively lesser amount of tensile material compared to steel may be used to form the reinforcing bar 100, with this providing associated cost and weight benefits. In addition, because non-metallic fibres are inherently corrosion resistant, the use of non-metallic fibres may lead to the elimination of concrete cancer. Further, a fibrous material may be selected whereby it has a better fire rating than steel.

Alternatively, the external casing 104 may be formed from a plurality of metal wire strands. For example, the metal selected for the strand may be a galvanised steel wire having high tensile and corrosion resistance. Alternatively, for some specific applications, another corrosion resistant metal may be employed for the wire, such as copper, or nickel alloy (e.g. Monel wire), etc.

A plurality of the fibres or metal wire strands may be woven into a mat prior to, or commensurate with, the formation of a tubular format. Whilst either a fine or coarse weave may be employed, a coarse weave may be less costly and easier to produce. A coarse weave may provide a texture to the tubular format, allowing the fibre or wire surface to 'key' into both the cementitious material to be reinforced, and the settable material within the tubular format. This can enable shear load to be transferred between the reinforcing element and the surrounding cementitious material. A coarse weave may also be more robust for the various applications to which the reinforcing bar 100 is subjected. A coarse fibre or stand may also be produced by braiding, and this braided strand may then be woven.

The weave of the plurality of fibres may be arranged to extend axially with respect to a longitudinal axis of the example reinforcing bar 100, so adding to end-to-end tensile resistance of the example reinforcing bar 100 in use, although in some applications the weave may be skewed or offset with respect to this longitudinal axis without significantly affecting tensile performance. The plurality of fibres may also be knotted, to provide a knotted weave, which can better bind with surrounding cementitious material in use.

When the settable material to be introduced into the casing 104 is a liquid or slurry (e.g. is water-based), an internal surface of the external casing 104 may be coated, impregnated or lined with a material that is resistant to penetration by the liquid component of the settable material. For example, the penetration resistant material may be impermeable or hydrophobic and may take the form of a membrane or lining 106. Whilst a lining 106 is shown in FIG. 1, the penetration resistant material may take the form of a coating or covering of the internal surface of the casing 104 which, for example, may be sprayed or screeded onto the internal surface. The casing 104 may alternatively be impregnated with the penetration resistant material (e.g. by being dipped or soaked therein, such as after weaving and prior to the formation of the tubular format). The membrane or lining 106 may comprise a polymer (e.g. a latex-based polymer) that cures after lining the casing, or that cures after having been applied to or impregnated in the casing.

Figure 2B:
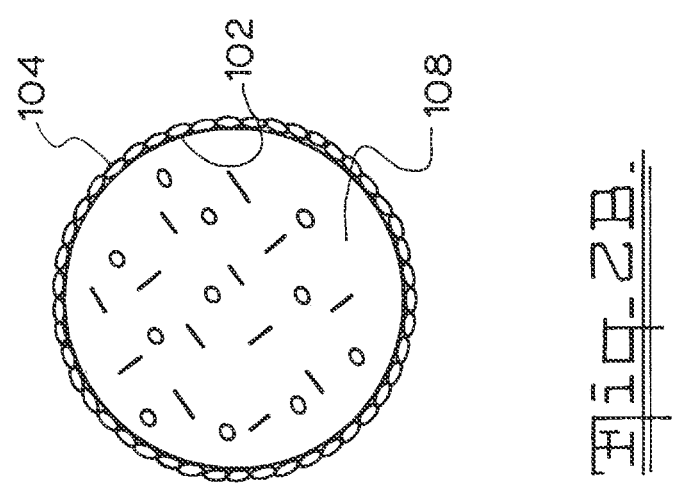
FIG. 2B shows a diagrammatic cross-sectional view of the example reinforcing element in a filled form.
Figure 2A:
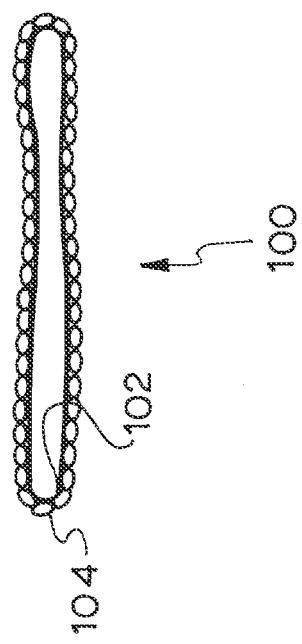
FIG. 2A shows a diagrammatic cross-sectional view of the example reinforcing element in a collapsed form prior to being filled.

FIG. 2B shows a diagrammatic cross-sectional view of the example reinforcing element in a filled form. In this regard, the casing 104 has assumed a tubular form and has been filled with an example settable material 208. For example, the settable material may be a curable cementitious material or may be a settable polymer, such as a polymer resin. The settable material may be selected to have shear-resistance, to enhance the properties of the example reinforcing bar 100 in use. The settable material may optionally be reinforced by the addition and dispersion therethrough of a fibrous material such as glass, carbon or aramid fibre, etc (e.g. short lengths or fragments thereof).

When the settable material is a cementitious material it may be a hydraulic or non-hydraulic cement. The hydraulic cement may include a Portland cement or a pozzolan, with either of these cements optionally blended with various additives such as slag, flyash, clinker, gypsum, volcanic ash, lime, limestone, hydrated lime, kaolin or metakaolin, silica fume, etc. The hydraulic cement may alternatively include a non-Portland, non-pozzolan cement such as a magnesium-based cement, slag-flyash, slag-lime, slag-gypsum, slag-anhydrite, calcium sulfoaluminate and calcium aluminate cements, a geopolymer cement of e.g. alkali metal silicate and aluminosilicate, etc. The non-hydraulic cement may be lime or gypsum. The settable cementitious material for the reinforcing bar 100 may optionally comprise a concrete (e.g. having aggregate, sand and/or other fillers dispersed therethrough) which may be further reinforced by the fibrous material (as above).

When the settable material is a polymer resin it may be a thermosetting polymer such as an epoxy resin, polyester resin, phenol- or urea-formaldehyde resin, melamine resin, a polyimide resin, a cyanate ester or polycyanurate resin, etc. The polymer resin may optionally be blended with a cementitious material. The polymer may also comprise a foaming or expansive polymer, which may "inflate" the casing after being introduced therein. The polymer resin may be further reinforced by the fibrous material (as above).

When the tension-resistant material is a fibrous material, and the settable material is a cementitious material or a polymer, the combination can provide a composite element (such as a composite structural beam of a slender format) that has a high structural modulus and that is able to carry shear loads and be deflection resistant.

When the settable material is a cementitious material it may be the same as or different to the cementitious material that is to be reinforced by the example reinforcing bar 100 in use. For example, prior to locating the reinforcing bar 100 in a foundation structure, the casing 104 can be filled onsite with the cementitious material that is employed onsite, be allowed to sufficiently cure, and then the same cementitious material that is to be reinforced by the sufficiently-cured reinforcing bar 100 can be poured around and outside the reinforcing bar in situ. In the case where the reinforcing bar 100 is prefabricated (e.g. offsite), the cementitious material may be the same or different to that cementitious material used for the foundation structure.

Two alternative methods for forming (such as by manufacture of) an example reinforcing element in the form of an example reinforcing bar are schematically illustrated in each of FIGS. 3 and 4.

In the method illustrated by FIG. 3, an example reinforcing bar 300 is produced on site, such as at a foundation structure to be formed and poured. In this regard, the external casing 104 with optional lining is manufactured offsite at a factory such as by weaving and seaming a long length, and is then rolled onto a spool for storage. The spool is then transported to the site, ready for filling with a settable material, for example, with the concrete to be used at the site. A different settable material (e.g. polymer resin) may be used, but this may add additional complexity and cost.

Discrete, individual lengths 310 of the casing 104 may be unrolled and cut 312 from the long roll 102 on the spool 103, each ready to be filled. One end of each length of casing may be tied or otherwise sealed closed 314, and then each length, usually in a flat state from which it is "inflated", can be pumped full with wet concrete 316 via pump 318 and allowed to cure. This may take place in situ (i.e. with each length already positioned within the formwork for the foundation, then being pumped full with concrete). Alternatively, the lengths 310 may be formed and filled with concrete adjacent to the formwork and, once sufficiently cured, may be lifted and secured into place on the formwork. In either case, the casing 104 may be hooked or tied onto the formwork to be appropriately located therewithin.

In an alternative method of forming up, a single long length of the casing 104 may be unrolled and cut from the spool 103, one end of which is tied, with this single long length then positioned within the formwork for the foundation, and being hooked or tied onto the formwork at appropriate locations. The flexible nature of casing 104 allows it to be bent, cornered, double-backed, etc. The single long length can then be pumped full with wet concrete and allowed to cure. Thus, in the case of a single long length, curing again takes place in situ in the formwork.

Whether the casing is filled adjacent to or within the formwork for the foundation structure, in either case, prior to curing, the example reinforcing bar may be fashioned into a suitable shape, allowing for accurate positioning and for a controlled or predetermined reinforcing outcome. Also, the filling onsite means that only the casing (e.g. in a flattened rolled form) needs to be transported and lifted into place adjacent to the formwork. A significant cost with steel reinforcing bars is the transportation and handling of such bars, whereby a bulk of this cost may be eliminated.

Once the example reinforcing bar 300 is suitably located and has sufficiently cured within the formwork, concrete may then be poured to form the foundation. The concrete flows around and binds with the fibrous material of the casing 104. Thus, the elongate reinforcing bars 300 become located and embedded within the foundation concrete.

In the method illustrated by FIG. 4, an example reinforcing bar 400 may be produced offsite (e.g. at a factory). In this regard, the external casing 404 with lining 406, together with the infill of settable material, may all be manufactured offsite, whereby a prefabricated and finished reinforcing bar 400 may then be transported onsite. Prefabrication can allow for mass production and the associated economies of scale, and may more easily allow for different settable materials to be employed in fabricating the reinforcing bar, such as polymeric resins, or low cost concrete (e.g. such as a concrete filled with high levels of flyash, slag, etc).

In the method illustrated by FIG. 4, the casing 404, and optionally the lining 406 when employed, can be woven as a continuous tubular length, directly around a tubular part 419 of a hollow mandrel 420. The mandrel 420 may also act as a feed tube for the settable material and, and in this regard, may have a flared open entrance 421 through which a settable material 422 may be pumped, via a pump 423 into the mandrel 420, to flow into tubular part 419.

Material for each of the casing 404, and optional lining 406, may each be unwound from respective spools 424, 426 which each hold fibrous strands. Weaving apparatus may then receive the strands, and arrange and form the respective tubes for the lining and then casing on and around the tubular part 419 of mandrel 420, as schematically depicted in FIG. 4. The progressively forming casing/lining can be drawn off at an opposite end 428 of mandrel 422. At this end, settable material that is exiting the interior of the tubular part is able to feed directly into the interior of the now formed tubular casing/lining. The filled casing 400 may be conveyed onto curing rollers 432, which may be located within a conveyor oven, whereupon the filled casing 400 is conveyed and is allowed (or encouraged such as by heating, accelerants, etc) to dry and cure.

The now cured elongate reinforcing bar 400 is cut to length at cutting station 434, ready for storage or for distribution and transportation to site. In this way elongate reinforcing bar 400 may be mass produced.

In the method of FIG. 4 it may not be necessary to employ a lining 406, as the liquid of the settable material may desirably flow across the casing 404 and drain away to be captured for re-use. For example, where the settable material is aqueous based, the draining water may be captured and may be recycled for use in producing more settable material). Also, this drainage may accelerate curing of the settable material within the filled casing 416 and may reduce drying time and/or heating input.

Prior to or once the cured reinforcing bar 400 is transported to the site, it may be further cut to length. At the time of cutting onsite, a short amount of settable material within the tubular casing/lining can be cut, fragmented or otherwise broken away, to enable tying or anchoring of that end of the casing/lining.

Because the casing of the example reinforcing bars 300 and 400 is in each case able to be tied and anchored, the welding associated with steel reinforcing bars can be eliminated.

The example reinforcing bars 100, 300, 400 as described herein can be mass produced offsite or tailor made on site. A given length of reinforcing bar 100, 300, 400 may be considerably lighter, and easy to handle and transport, than an equivalent length of steel reinforcing bar. The example reinforcing bars may also be fashioned into a desired or required shape onsite (e.g. within formwork) providing for accuracy, flexibility and ease of use, reduced handling and reduced "forming-up" time. The casing may be tied to structures, eliminating the welding required for steel reinforcing bar. The example reinforcing bars 100, 300, 400 may also be formed from a wide variety of tensile and settable materials, allowing for tailoring of the reinforcing bar to a given application, and avoiding issues associated with steel reinforcing such as concrete cancer.

While the above description is concerned with reinforcing bars for use in foundation structures, it will be understood that the reinforcing bars are not limited to such applications. For example, they may be used as a stand-alone product such as a beam, etc in construction, or may be used in landscaping applications as a boarder, part of a wall, etc. The fibrous casing may also provide a textured, aesthetic and tactile external surface.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). Further, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a fastener having at least one of A, B, and C" would include but not be limited to fasteners that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a fastener having at least one of A, B, or C" would include but not be limited to fasteners that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into sub-ranges as discussed above. Finally, as will be understood by one skilled in the art, a range includes each individual member.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods which can, of course, vary. It is also to be understood that the terminology used herein is for the purpose of describing particular embodiments only, and is not intended to be limiting.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The invention claimed is:

1. A method of forming a reinforcing element for use in reinforcing, a cementitious material, the method comprising:
   disposing a flexible tension-resistant material, such that the flexible tension-resistant material has, or assumes, a tubular form and is made from a material formed from a plurality of one or more woven fibers or from a plurality of one or more metal wire strands woven together into the flexible tension-resistant material;
   lining an internal circumference of the tubular form of the flexible tension-resistant material with another material, wherein the other material is resistant to penetration by a settable material including one of a curable cementitious material and a settable polymer, and wherein the other material is a latex-based polymer;
   introducing the settable material under pressure into a discrete length of the flexible tension-resistant material by positioning the flexible tension-resistant material around a formed tubular length of the settable material; and
   curing the settable material, such that the flexible tension-resistant material assumes a tubular form.

2. The method of claim 1, further comprising: one of;
   separating the discrete length of the flexible tension-resistant material is from a longer length of the flexible tension-resistant material, wherein another discrete length of the settable material is introduced into the discrete length of the flexible tension-resistant material; and
   positioning the flexible tension-resistant material around an elongate hollow mandrel, wherein the discrete length of settable material is formed, when the settable material passes through the mandrel and into a tubular form of the flexible tension-resistant material.

3. The method of claim 1, wherein the other material adds an additional layer internal to the tubular form of the flexible tension-resistant material.

4. The method of claim 1, wherein, the other material is hydrophobic when the settable material comprises water.

5. The method of claim 1, wherein the one or more metal wire strands include galvanized steel wire.

6. The method of claim 1, wherein one or more of the one or more woven fibers and the one or more metal strands are coarsely woven.

7. The method of claim 1, wherein a weave of one or more of the one or more woven fibers and the one or more metal strands is arranged to one or more of extend axially and skew with respect to a longitudinal axis of the reinforcing element.

8. The method of claim 1, wherein the settable material is shear-resistant.

* * * * *